United States Patent [19]

Graham

[11] 4,070,121
[45] Jan. 24, 1978

[54] WEAR INDICATING BALL JOINT
[75] Inventor: John P. Graham, Creve Coeur, Mo.
[73] Assignee: Moog Automotive, Inc., St. Louis, Mo.
[21] Appl. No.: 752,541
[22] Filed: Dec. 20, 1976
[51] Int. Cl.² .............................................. F16C 11/06
[52] U.S. Cl. ........................................ 403/27; 403/132
[58] Field of Search ................ 403/27, 132, 138, 131; 116/114 Q; 188/1 A

[56] References Cited

U.S. PATENT DOCUMENTS

| 2,953,401 | 9/1960 | Moskovitz et al. | 403/131 |
| 3,791,748 | 2/1974 | Goodrich, Jr. et al. | 403/27 |
| 3,813,178 | 5/1974 | Herbenar et al. | 403/27 |
| 3,817,640 | 6/1974 | Carter et al. | 403/138 |
| 3,820,907 | 6/1974 | Hassan | 403/27 |
| 3,890,052 | 6/1975 | Herbeuar et al. | 403/27 |

FOREIGN PATENT DOCUMENTS

| 2,241,751 | 3/1973 | Germany | 403/27 |

Primary Examiner—Andrew V. Kundrat
Attorney, Agent, or Firm—Gravely, Lieder & Woodruff

[57] ABSTRACT

A ball joint subject to wear in service and having an exposed indicator extending through the cover so as to be in position for visual examination for indicating wear which can be both axial and transverse to the joint axis. The indicator is confined against rotation and cooperates with the opening in the cover of the ball joint to show the extent of wear.

9 Claims, 14 Drawing Figures

WEAR INDICATING BALL JOINT

FIELD OF THE INVENTION

This invention pertains to a wear indicating ball joint and is more particularly directed to an automotive type ball joint or tie rod end arranged to indicate wear which results in horizontal or radial looseness, as well as vertical or axial looseness. Inidcation of horizontal or radial wear in ball joints and tie rod ends is of utmost importance because it affects alignment setting of the vehicle steerable wheels which, in turn, has an effect on performance and tire wear.

SUMMARY OF THE INVENTION

The invention is directed to novel construction which will facilitate inspection of vehicle ball joints for wear in both the horizontal and vertical directions of orientation of the ball joint components, whereby inspection errors may be avoided or practically eliminated by means which may be easily visually examined.

Ball joints embody a mechanical assembly of elements which are utilized in an extremely critical portion of a vehicle to operably connect the steerable wheels to the vehicle frame, and to operably connect the steering wheel with the wheels for purpose of directional control of the vehicle. Obviously, ball joints are subjected to all kinds of conditions and each one is adapted to carry a substantial part of the vehicle load at all times. When wear develops steering becomes sloppy and the reaction of the steerable wheels on the road surface leads to irratic steering control because of excessive play or looseness in the joints. An indicator which will accurately reveal the wear characteristic of a ball joint is a highly useful means for insuring continued safe operations of a vehicle.

Ball joints used for operably connecting vehicle steerable wheels to the vehicle frame are generally designed to perform the important function of transmitting the weight of the vehicle into the wheel and tire, as well as to control the attitude of the steerable wheel during vehicle operation. Ball joints used in connection with vehicle steerable wheels are, therefore, classified as prime load carrying ball joints, while the attitude controlling ball joints are generally classified as follower or guiding ball joints.

While the foregoing load carrying and follower type ball joints are extremely important in maintaining a correct attachment and alignment of the steerable wheels to the vehicle frame, the steering mechanism for the steerable wheels embodies equally important ball joints which are subjected to loads for maintaining the steerable wheels in correct toe alignment. In the steering linkage usually provided, the steering link itself is connected by tie rods to the respective steerable wheels, and the tie rods are provided with ball joints which necessarily must be capable of sustaining loads applied in various directions, but primarily loads directed along the axis of the tie rods.

In its broadest aspect, the object of the present invention is to provide a ball joint having an internal bearing assembly which is subject to wear and means which will continually indicate the extent of wear and make it possible to visually examine the extent of wear without the necessity for removing the ball joint, but by checking the ball joint for wear by removing the load therefrom through jacking the vehicle under the frame or other similar portion of the vehicle.

BRIEF DESCRIPTION OF THE DRAWINGS

Presently preferred embodiments of the invention are shown in the accompanying drawings wherein.

DETAILED DESCRIPTION OF THE EMBODIMENTS

Figure 1:
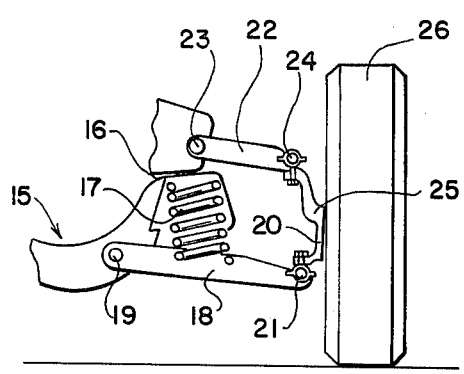
FIG. 1 is a schematic elevational view of a vehicle wheel mounting assembly in which the lower control arm connecting the wheel with the vehicle frame is provided with the primary load carrying ball joint, and the upper arm is connected to the wheel by a follower ball joint.

Turning now to FIG. 1 there is seen a fragmentary portion of a vehicle frame 15 provided with a seat 16 for the upper end of a coil suspension spring 17 which is adapted to bear downwardly upon a lower control arm 18 connecting to the frame 15 at the frame pivot 19 and connected to the wheel mounting spindle bracket 20 by a prime load carrying ball joint 21 mounted under tension in the outer end of the lower arm 18. An upper arm 22 is pivotally connected to the vehicle frame at inner pivot 23, and the outer end carries a follower ball joint 24 connected into the upper arm 25 of the spindle bracket 20. It can be appreciated that the tire 26 supports a portion of the vehicle load tension in the ball joint 21 transmitted through the spindle 20, ball joint 21, arm 18, spring 17, and spring seat 16. The upper arm 22 provides the lateral or horizontal stability to the tire 26 by maintaining the tire in a generally upright position. In view of the character of the assembly shown in FIG. 1 prime loads in the ball joint 21 are vertically directed along the axis of the ball joint, and the follower ball joint 24 is subjected to loads directed horizontally through arm 22 which is in a radial direction.

Figure 2:
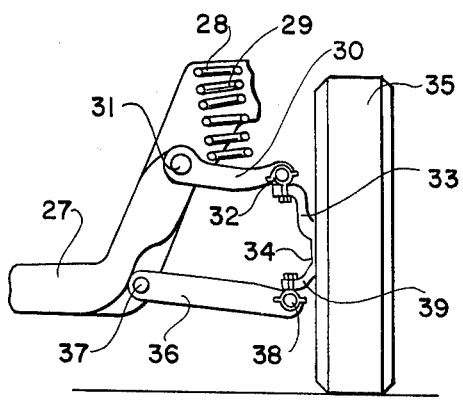
FIG. 2 is a view similar to FIG. 1, but illustrating a typical wheel mounting arrangement in which the upper arm connecting the wheel to the vehicle frame carries the prime load carrying ball joint and the lower arm carries the follower ball joint.

In FIG. 2 there is shown a typical wheel mounting arrangement for a vehicle frame 27 provided with an upper seat 28 for a coil spring 29. The spring is adapted to bear upon an upper control arm 30 pivotally connected at 31 to the frame 27 and engaged through a prime load carrying ball joint 32 with the upper arm 33 of the spindle bracket 34 for the tire 35. Control of the attitude of the tire 35 is obtained through the lower control arm 36 pivotally connected at 37 to the frame 27 at its inner end, and connected at its outer end through the follower ball joint 38 attached to the lower arm 39 of the spindle bracket 34. In this view the ball joint 38 is subjected to loads directed generally horizontally along the arm 36 which would be horizontal loads in the ball joint 38. The vehicle load is carried in the ball joint 32 in a generally vertical direction which would be in the direction along the axis of the ball joint 32.

Figure 3:
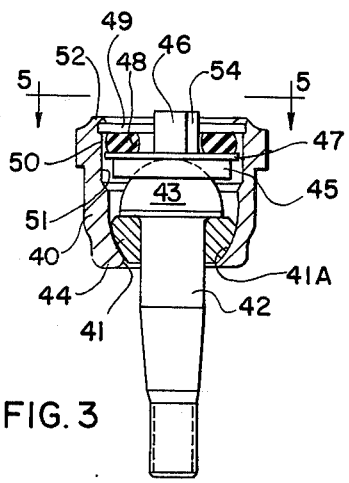
FIG. 3 is a longitudinal sectional view of a prime load carrying ball joint.
Figure 4:
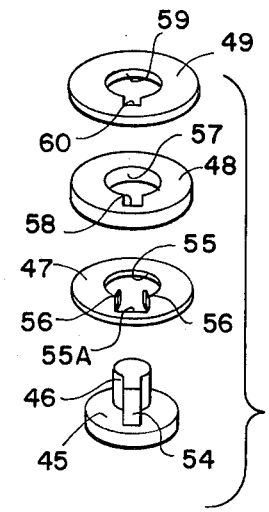
FIG. 4 is an exploded perspective view of certain components contained in the ball joint of FIG. 3.

Turning now to FIGS. 3 and 4 there is shown a typical prime load carrying ball joint assembly representative of the ball joints 21 and 32 described in FIGS. 1 and 2. Such a ball joint includes a housing 40 adapted to be press fitted (or threaded) into the control arm (either arm 18 or arm 30). The housing has one end formed with an opening 41 adjacent an internal bearing seat 41A to allow for the projection of the shank 42 on the stud head 43. The stud head 43 is carried by a bearing 44 engaged on the seat inside the opening 41 and surrounding the shank 42 in the area just below the head 43. The stud head 43 has a semi-spherically formed surface, and is engaged at such surface by a bearing pressure plug 45 which is formed with a complimentary spherical surface on its underside and with a projection 46 on its upper surface. The body of the plug 45, formed of suitable metal or plastic material, is engaged on its upper surface by a clutch plate 47. A resilient element 48 rests on top of the clutch plate 47 so as to be directly beneath a closure plate 49 which is secured in position on a counterbored shoulder 50 formed in the bore 51 of the housing 40 and held seated on the shoulder by any suitable means, such as, for example, spinning over a flange 52 forced on the upper open end of the housing 40. The element 48 acts as a seal to exclude contaminants from the interior of the ball joint as it prevents leakage past the plate 47. Since the surfaces of resilient element 48 has high friction characteristics, the interposed clutch plate 47 provides a surface to separate the plug 45 from direct contact on element 48 and on which the plug 45 can slide in order to follow lateral displacement of the stud head 43 and indicate wear.

The several components described in connection with FIG. 3 are shown in exploded perspective view in FIG. 4. An important feature of the components is the formation of a projection 46 in the form of a key 54 on the plug 45. The key 54 extends laterally of the projection 46 and of substantially the same length. The clutch plate 47 is formed with a central opening 55 having a lateral recess 55A to form a key hole for the reception of the key 54. The opposite margins of the recess 55A are formed with flanges 56 in position to embrace the key element 54. The resilient element 48 is also formed with a key hole opening 57 having a lateral recess 58 so as to match the configuration of the key 54. Finally, the closure plate 49 is formed with a central slotted and key hole shaped aperture 59 having a lateral extension 60 to receive the key 54 on the bearing plug 45.

Figure 5:
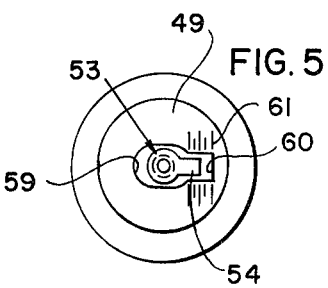
FIG. 5 is a top plan view of the ball joint shown in FIG. 3 taken along the line 5—5 in FIG. 3 to illustrate the wear indicating device in the position of an unused ball joint.
Figure 7:
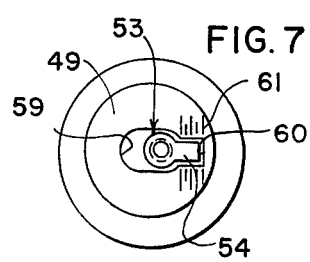
FIGS. 6 and 7 are views similar to FIGS. 3 and 5 in which the ball joint has been shown to illustrate a typical worn condition.
Figure 6:
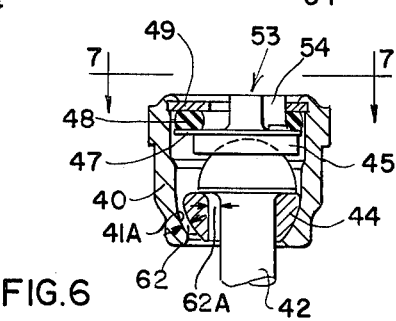

The ball joint in its unused condition is shown in FIGS. 3 and 5 in which the closure plate 49 is seen to be provided with wear indicating indicia 61 scribed on both sides of the lateral extension 60 for the key hole. The key extends through the closure plate opening 59 which is larger than the key unit 53. The key element 54 is disposed in the lateral opening 60 so that its outer side face is aligned with one of the indicia markings 61. In this view of the ball joint, there is no wear or looseness so the indicator key 54 has no motion in the key hole of the closure plate 49 and thus the element does not move appreciably relative to the indicia 61. FIGS. 6 and 7 are intended to show a worn ball joint in which the bearing 44 has been worn so as to have lateral play with respect to the seat 41A in housing 40, as exhibited by the gap spacing 62. In addition the shank 42 of the stud has been worn around the upper end so as to produce looseness, as exhibited by the gap spacing 62A. The view of FIG. 6 is exaggerated for the purpose of exhibiting the character of the wear that is found in excessively worn prime load carrying ball joints. The wear is indicated by the key projection 54 being movable laterally in the opening 60 in the cover plate 49, thereby visually revealing the extent of radial wear which has occurred on and between the bearing 44 and the stud shank 42. Further, when the stud of the ball joint is unloaded the key 54 is easily moved back and forth in the key hole when excessive wear is present.

The ball joint assembly shown in FIGS. 3 and 6 is also capable of indicating axial wear in the ball joint. For indicating axial wear, the key 54 in unused ball joint projects a predetermined distance outwardly of the upper surface of the closure 49. As axial wear occurs in the ball joint, the key will receed relative to the key hole in the closure plate 49 and will eventually have its outer end flush with or slightly below the exposed surface of the closure plate 49.

Figure 8:
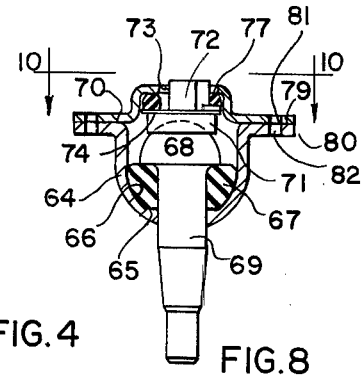
FIG. 8 is a longitudinal sectional view of a typical follower type ball joint.
Figure 9:
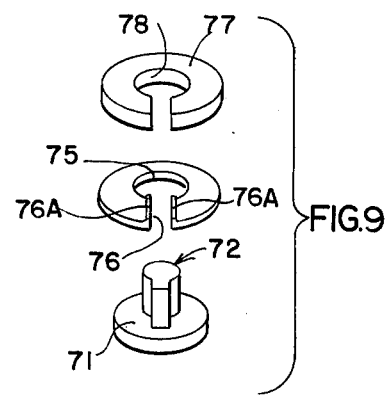
FIG. 9 is an exploded perspective view of certain components in the ball joint of FIG. 8.
Figure 10:
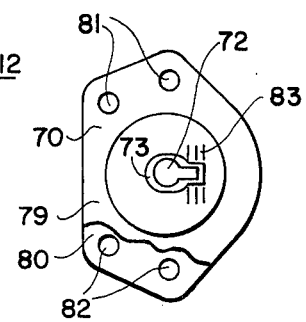
FIG. 10 is a top view of the ball joint of FIG. 8 as seen along line 10—10.

Turning now to FIGS. 8 and 9 there is shown the construction of a follower type ball joint in which a housing 64 is formed with an opening 65 adjacent the bearing seat surface 66 for the support of a suitable bearing 67. The bearing 67 supports the headed end 68 of a stud mounted with the shank 69 projecting through the opening 65. A housing cover 70 encloses a bearing plug 71 which is seated on the surface of the stud head 68 in position to have a key element 72 project outwardly of the housing 64 and through a key hole 73 in the housing cover 70. The bearing plug 71 carries a clutch plate 74 which is formed with a key hole 75 opening laterally at a slot 76 so as to receive the key 72. The opposite margins of the slot 76 are formed with flanges 76A so as to embrace the key 72. The plate 74 is engaged by a resilient element 77 formed with a suitable key hole 78 for the purpose of receiving the key 72. The resilient element 77 forms a seal between the cover 70 and the clutch plate 74 so as to exclude contaminants from the cavity in the housing occupied by the bearing 67 and the stud head 68. As seen in FIGS. 8 and 10 the cover 70 and the underlying portion of the housing 64 are formed with complimentary flanges 79 and 80 which are secured together to complete the assembly of the ball joint, and which are utilized for the purpose of mounting the ball joint in operative position by bolts or rivets extending through the flange apertures 81 in the cover 70 and matching apertures 82 in the housing flange 80.

The ball joint of FIG. 8 is shown in its unused condition and it is observed in FIG. 10 that the key 72 projects through the key hole 73 in the cover 70 and cooperates with indicia 83 marked on the exterior of the cover 70 adjacent the key hole 73. In the unused condition of the ball joint the key 72 is substantially fixed in relation to the indicia 83.

Figure 11:
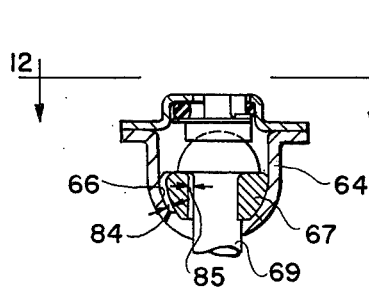
FIGS. 11 and 12 are respectively a sectional view and a top plan view of a ball joint which exhibits a worn condition as seen in FIG. 11 and as indicated in FIG. 12 which is taken along the line 12—12 in FIG. 11.
Figure 12:
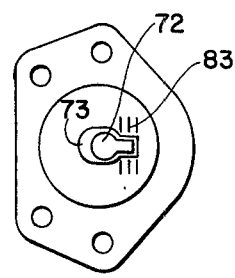

An excessively worn ball joint is shown in FIGS. 11 and 12 wherein the bearing 67 has been worn sufficiently to produce a gap space 84 between it and the housing seat 66. In addition wear between the bearing 67 and the shank 69 of the stud has produced a gap space 85 so that the shank 69 moves relative to the bearing 67 due to the gap space 85, and the bearing 67 is able to move relative to the housing 64 by reason of the gap space 84. The wear present in the ball joint shown in FIG. 11 is easily visually examined by the movement of the key 72 in the key hole 73 in a lateral direction relative to the longitudinal axis of the stud shank 69. The lateral movement is developed relative to the indicia 83 on the exterior of the cover 70, and this movement can be in opposite directions because of the internal wear as described above.

It has been pointed out above that a follower ball joint when mounted in either positions of FIG. 1 or FIG. 2 is subjected to lateral force in doing its job of maintaining the upright attitude of the tire 26 or 35. While the primary function of the key 72 is to visually reveal the condition of wear in the follower ball joint, it can be appreciated that wear will also cause the key 72 to gradually recede into the key hole 72. Axial wear can be visually observed by noting the amount of receeding of the key 72 into the key hole 73 from its initial outwardly projecting position. It is appreciated, therefore, that the key 72 performs the dual function of visually indicating both lateral wear and axial wear in the ball joint.

Figure 14:
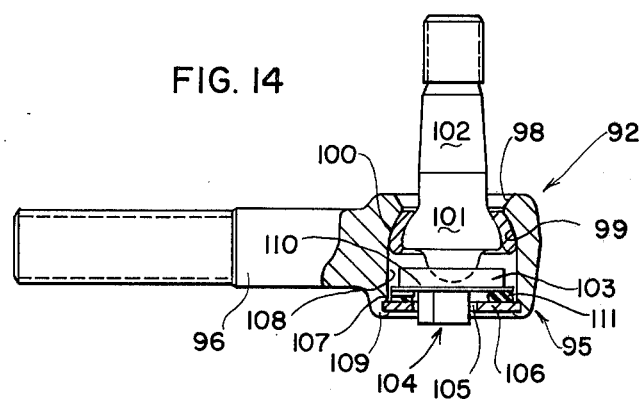
FIG. 14 is a fragmentary sectional view of a ball joint adapted for tie rod ends.
Figure 13:
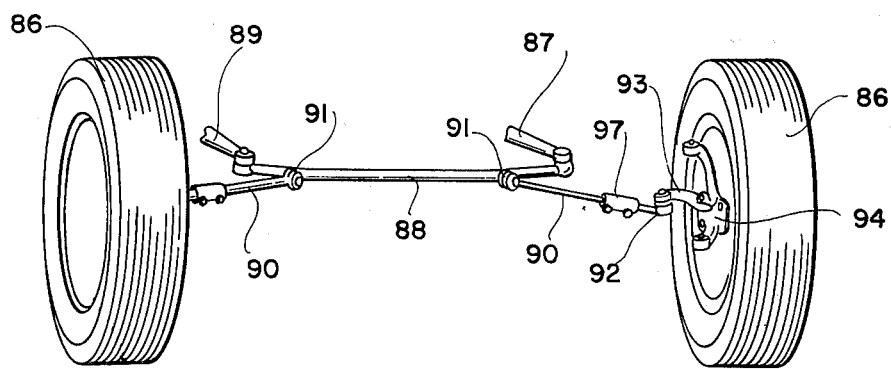
FIG. 13 is a schematic view of a representative assembly of steering links and tie rods in a vehicle steering assembly.

FIG. 13 is a schematic view of the steering mechanism for a vehicle having steerable wheels 86. The vehicle steering wheel (not shown) is connected in a known manner to the pitman arm 87 which swings in an arcuate path and is connected to steering linkage 88 which extends across the width of the vehicle and is supported at its opposite end by an idler arm 89. If is understood in the usual steering arrangement that the pitman arm 87 and the idler arm 89 direct the linkage 88 in a manner to exert a pull or a push on the tie rods 90 which are pivotally connected at 91 to the linkage 88, and pivotally connected at 92 to the arm 93 which is part of the wheels spindle bracket 94. The pivotal connection 92 for the tie rod at the right side of FIG. 13 is shown in FIG. 14 in the form of a tie rod ball joint housing 95 having a shank 96 which is adjustably connected to the tie rod 90 by a suitable sleeve 97 (FIG. 13). In the example of FIG. 13, the tie rod end is positioned with the housing 95 facing down and the shank 96 directed to the left, as seen in FIG. 14.

The housing 95 is formed with an opening 98 adjacent a bearing seat 99 which accommodates a bearing 100. The bearing 100 receives the headed end 101 of a stud in position to have the stud shank 102 project through the opening 98. A bearing plug 103 is mounted on the stud head 101 such that a key 104 is in position to project through a key hole 105 in a cover plate 106. The cover plate is fixedly mounted on a shoulder 107 in the bore 108 of the housing 95 and is held in position by spinning a flange 109 over the top of the cover, as is well understood in the art. The bearing plug 103 supports a clutch plate 110 which is formed with a suitable key hole of a character to permit the key 104 to pass therethrough. The clutch plate 110 allows the plug 103 to move laterally, as noted before in connection with clutch plates 47 and 74. A resilient element 111 is mounted between the plate 110 and the underside of the cover 106 in position to act as a seal for the purpose of excluding contaminants from the area occupied by the bearing 100 and the stud head 101.

It should now be clearly understood that as wear occurs in the tie rod of FIG. 14 the key 104 will develop lateral movement in the key hole 105 in the cover 106 and will also recede inwardly of the cover, thereby producing a visually indication of both lateral and axial wear in the bearing surfaces of the tie rod end. The major cause of wear in a tie rod is developed in the direction of the axis of the shank 96 so that the key 104 furnishes a positive indication of the condition of wear due to its movement laterally in the key hole 105. It is not believed necessary to show a top view of the cover 106 in order to display suitable indicia by which the relative movement of the key 104 can be visualized, as such indicia can be similar to that shown at 61 or 83 previously described.

In each form of ball joint herein shown and described the resilient element is of such size as to initially exert a desired preload on the stud head so at to accommodate production tolerance variations and thereby initially absorb looseness in the bearing surfaces. As wear develops in use the resilient element is able to expand and take up looseness up to the limit of its ability to expand. As the resilient element expands it forces the wear indicator key to recede in the key hole thereby furnishing the visual indication of axial wear. Where the ball joint is unloaded its lateral looseness or wear will become visually evident by movement of the key in the key hole. The key and its key hole may have other shapes than that shown in the drawings, so long as the key is prevented from rotating out of a position to align itself with the direction of maximum lateral wear, as that is the wear condition important to indicate.

In view of the provision of a wear indicator key operating in a key hole, it is advantageous to give the key a highly visible color so that the wear indication provided thereby can be easily spotted once the exterior dirt has been wiped off. Hence the application of a vivid color increases the visibility of the key and assures the early detection of excessive wear and looseness in the bearing surfaces of the respective ball joints.

What is claimed is:

1. A ball joint comprising: a housing having two openings thereto; a bearing seated adjacent one housing opening; a stud having a headed end carried within said housing and said bearing and a shank extending axially through said bearing to the exterior of said housing through said one opening; a perforated closure fixed to said housing at said second opening; and wear indicator means operatively disposed in said housing on said headed end of said stud, a portion of said wear indicator projecting through said perforation in said closure to the exterior to indicate the internal wear of said ball joint, and said wear indicator means projecting through said perforation with sufficient radial clearance so as to be movable relative to said closure in a direction axially of said stud shank and tranversely of said axial direction, whereby two conditions of predetermined excessive wear in said ball joint can be independently indicated at the exterior of the ball joint.

2. The ball joint of claim 1 wherein said closure perforation has a key hole configuration and said wear indicator portion is an axially directed element with a lateral projection thereon loosely matching said key hole so as to move laterally relative to said closure and be non-rotatively engaged in said key hole perforation.

3. The ball joint of claim 1 wherein said wear indicator means is formed with a bearing portion carried by and movable with said stud headed end, whereby displacement movement of said indicator means due to wear of said bearing in said housing and between said shank and bearing is indicated.

4. The ball joint of claim 1 wherein resilient means is disposed adjacent said closure within said housing, and clutch means is located between said indicator means and said resilient means whereby said wear indicator means is rendered movable in a direction substantially normal to the axis of said stud shank.

5. The ball joint of claim 4 wherein said resilient means and clutch means have openings substantially matching the closure perforation, and said resilient means acts as a seal to exclude contaminants.

6. A ball joint comprising: a housing having a first opening adjacent a bearing seat; a bearing engaged on said bearing seat so as to be free to rock and turn relative to said bearing seat; a headed stud engaged on said bearing and having a shank extending through the bearing and first housing opening; a bearing element engaged on said headed stud within said housing and having a wear indicator projection extending outwardly of said housing at a second opening thereof; a plate element engaged on said bearing element over said projection; a resilient element disposed on said plate element and surrounding said projection; and a closure plate fixed in position at said second opening and formed with an opening to allow said projection to extend therethrough; said wear indicator projection and said closure plate opening having generally complementary shapes in which said wear indicator projection is held against rotating, said closure opening being sufficiently larger than said indicator projection in a radial direction so that said indicator projection is free to move relative to said closure opening in directions to indicate externally of the ball joint the extent of predetermined excessive axial and radial wear within the ball joint between said housing and bearing and between said bearing and headed stud shank.

7. The ball joint of claim 6, wherein said resilient element acts as a seal adjacent said closure plate and said plate element to exclude contaminants getting into said bearing through said second opening and said plate element separates said resilient element and bearing element to permit movement of said bearing element relative to said resilient element.

8. The ball joint of claim 6 wherein said closure plate is formed with an opening to pass said wear indicator projection, said closure plate having indicia on the exterior adjacent said closure opening to measure the movement of said bearing element with said stud head and relative to said closure plate indicia.

9. The ball joint of claim 6, wherein said housing is provided with means to support the ball joint in operative position with said wear indicator exposed to view for visual examination, and said wear indicator is provided with a distinguishing color to aid said visual examination.

* * * * *

UNITED STATES PATENT AND TRADEMARK OFFICE
CERTIFICATE OF CORRECTION

PATENT NO. : 4,070,121

DATED : January 24, 1978

INVENTOR(S) : John P. Graham

It is certified that error appears in the above-identified patent and that said Letters Patent are hereby corrected as shown below:

Column 1, line 9, spelling error - "Inidcation" should be "Indication"

Column 4, after line 45, the following sentence should be added - "The clutch plate 74 performs the same function for plug 71 that the clutch plate 47 performs for plug 45".

Column 5 - line 24, numeral "72" is incorrect; it should be numeral "73".

Column 5 - line 37, the word "If" should be "It"

Signed and Sealed this

Twenty-third Day of May 1978

[SEAL]

Attest:

RUTH C. MASON
Attesting Officer

LUTRELLE F. PARKER
Acting Commissioner of Patents and Trademarks